(12) United States Patent
Li et al.

(10) Patent No.: US 12,438,624 B1
(45) Date of Patent: Oct. 7, 2025

(54) DIRECTION OF ARRIVAL ESTIMATION METHOD AND DEVICE BASED ON STEERING VECTOR MATRIX RECONSTRUCTION

(71) Applicant: SHENZHEN UNIVERSITY, Guangdong (CN)

(72) Inventors: Qiang Li, Shenzhen (CN); Zhenhui Wang, Shenzhen (CN); Lei Huang, Shenzhen (CN); Xinzhu Chen, Shenzhen (CN); Yuhang Xiao, Shenzhen (CN); Weize Sun, Shenzhen (CN); Peichang Zhang, Shenzhen (CN); Xiaopeng Li, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 19/039,257

(22) Filed: Jan. 28, 2025

(30) Foreign Application Priority Data

Apr. 3, 2024 (CN) .......................... 202410396218.7

(51) Int. Cl.
*H04B 17/20* (2015.01)
*G06F 17/11* (2006.01)
*G06F 17/16* (2006.01)

(52) U.S. Cl.
CPC ........... *H04B 17/252* (2023.05); *G06F 17/11* (2013.01); *G06F 17/16* (2013.01)

(58) Field of Classification Search
CPC ........ G06F 30/20; G06F 18/214; G06F 30/00; G06F 30/17; G06F 30/23; G06F 2111/10;

(Continued)

(56) References Cited

U.S. PATENT DOCUMENTS

2004/0046695 A1* 3/2004 Brothers, Jr. ............. G01S 3/32
342/427
2004/0114695 A1* 6/2004 Astely .................. H04B 7/0857
375/350

(Continued)

FOREIGN PATENT DOCUMENTS

| CN | 110174658 A | 8/2019 |
|----|-------------|--------|
| CN | 110798251 A | 2/2020 |

(Continued)

OTHER PUBLICATIONS

Chinese Office Action issued Mar. 6, 2024, in Chinese Application No. 202410396218.7, 4 pages.

*Primary Examiner* — Ajibola A Akinyemi
(74) *Attorney, Agent, or Firm* — Maier & Maier, PLLC (57) ABSTRACT

A DoA estimation method and device based on steering vector matrix reconstruction, related to the field of array signal processing. The method includes: obtaining an array sampling covariance matrix according to an array received signal; setting a target variable, and limiting a feasible domain of the target variable by using two operators to determine a first constraint condition; characterizing an estimation error based on the target variable and the array sampling covariance matrix, and using the characterized estimation error as a second constraint condition; establishing an initial optimization model according to a preset norm based on partial sum of singular values and constraint conditions of the target variable; determining a multivariable optimization model according to the initial optimization model; and solving the multivariable optimization model to obtain an optimal result; analyzing the optimal result to obtain a DoA of the target incident signal.

7 Claims, 6 Drawing Sheets

(58) Field of Classification Search
CPC .... G06F 30/398; G06F 2119/18; G06F 17/10; G06F 18/217; G06F 30/27; G06F 18/2193; G06F 18/253; G06F 30/15; G06F 30/333; G06F 17/16
USPC ..................................................... 455/226.1
See application file for complete search history.

(56) References Cited

U.S. PATENT DOCUMENTS

2004/0150558 A1* 8/2004 Li .......................... H01Q 3/24
342/368
2023/0160991 A1   5/2023 Li et al.

FOREIGN PATENT DOCUMENTS

| CN | 112363110 A | 2/2021 |
| CN | 114814830 A | 7/2022 |

\* cited by examiner

DIRECTION OF ARRIVAL ESTIMATION METHOD AND DEVICE BASED ON STEERING VECTOR MATRIX RECONSTRUCTION

CROSS-REFERENCE TO RELATED APPLICATIONS

The present application claims priority to Chinese Patent Application No. 202410396218.7, filed on Apr. 3, 2024, the content of all of which is incorporated herein by reference.

FIELD

The present disclosure relates to the technical field of array signal processing, in particular to a direction of arrival estimation method and device based on steering vector matrix reconstruction.

BACKGROUND

Array signal processing is an important research direction in modern signal processing and is widely used in radar, communication, seismic exploration, logistics tracking, medical imaging and other fields. Direction of arrival (DoA) estimation is a main research content of array signal processing and belongs to parameter estimation problem. Its basic idea is to use an array composed of multiple sensors in space to obtain electromagnetic wave signals, and use multidimensional information of signals, such as time domain and spatial domain, to obtain an estimation of signal incident angle.

The most commonly used method for DoA estimation is to use spatial spectrum estimation methods, such as Multiple Signal Classification (MUSIC) Algorithm and Estimation of Signal Parameters via Rotational Invariance Techniques (ESPRIT) Algorithm, in which by constructing an array covariance matrix, the signal subspace or noise subspace is obtained to estimate the target angle. In the past decade, sparsity-based DoA estimation methods have been proposed. These methods transform a nonlinear parameter estimation problem into a sparse signal recovery problem under a linear model. L1-Regularized Singular Value Decomposition (L1-SVD) and Sparse Bayesian Learning (SBL) are two representative data-based methods, but these methods are based on predefined discrete grids. If a finer grid is used, it will lead to strong correlation between adjacent atoms, which is contrary to the restrictive equidistant characteristics of compressed sensing. Therefore, the discretization strategy may reduce the performance of sparsity-based methods. Gridless methods such as Sparse and Parametric Approach (SPA), Atomic Norm Minimization (ANM), and Covariance Matrix Reconstruction Approach (CMRA), etc. have been proposed to solve the basis mismatch problem caused by grid discretization in grid methods.

At present, gridless DoA estimation methods may not give satisfactory performance when the signal-to-noise ratio (SNR) is low or the angular resolution is low. Therefore, there is an urgent need for a DoA estimation method to solve the problem of DoA estimation of incident signals based on array antennas when the angular separation of the incident signals is small.

SUMMARY

The present disclosure aims to provide a direction of arrival estimation method and device based on steering vector matrix reconstruction to solve the problem of DoA estimation of incident signals based on array antennas when the angular separation of the incident signals is small.

To achieve the mentioned purpose, the present disclosure provides following schemes:

A direction of arrival estimation method based on steering vector matrix reconstruction, where the method includes:

obtaining an array sampling covariance matrix according to an array received signal; where the array received signal is obtained by receiving a target incident signal using an array antenna; setting a target variable, and limiting a feasible domain of the target variable by using a Hankel matrix transformation operator and a column extraction operator, and determining a first constraint condition of the target variable; the Hankel matrix transformation operator is configured to transform a vector or a matrix into a Hankel matrix; the column extraction operator is configured to extract columns of a matrix;

characterizing an estimation error of an array covariance matrix based on the target variable and the array sampling covariance matrix, and using the characterized estimation error as a second constraint condition of the target variable; the array covariance matrix is composed of the array sampling covariance matrix and the estimation error of the array covariance matrix;

establishing an initial optimization model according to a preset norm based on partial sum of singular values and constraint conditions of the target variable; the constraint conditions include the first constraint condition and the second constraint condition;

determining a multivariable optimization model according to the initial optimization model; solving the multivariable optimization model based on an alternating direction method of multipliers to obtain an optimal result; the optimal result includes an optimal target variable; analyzing the optimal result to obtain a direction of arrival of the target incident signal.

The characterizing an estimation error of an array covariance matrix based on the target variable and the array sampling covariance matrix, and using the characterized estimation error as a second constraint condition of the target variable, includes:

characterizing the array covariance matrix according to the target variable;

characterizing the estimation error of the array covariance matrix according to the characterized array covariance matrix and the array sampling covariance matrix;

calculating norms of the estimation error to obtain the second constraint condition of the target variable.

The establishing an initial optimization model according to a preset norm based on partial sum of singular values and constraint conditions of the target variable, includes:

replacing the first constraint condition by the preset norm based on partial sum of singular values to obtain a first objective function;

determining an expression of the initial optimization model according to the second constraint condition and the first objective function.

The expression of the initial optimization model is:

$$\min_{U,\gamma} \frac{1}{2}\sum_{i=1}^{L}\|\mathcal{R}[Q_i[U]]\|_{p=1} \text{ s.t. } \|UU^H + \gamma I - \hat{R}\|_F^2 \le \epsilon, \gamma \ge 0,$$

where $$\min_{U,\gamma}(\cdot)$$

represents optimizing a variable to minimize an objective function; U represents a first target variable; γ represents a second target variable; i represents an index; L represents a quantity of the incident signals; $\mathcal{R}$ represents the Hankel matrix transformation operator; $Q_i$ represents the column extraction operator; p represents a series of the norms; s.t. represents the constraint condition; $(\cdot)^H$ represents a conjugate transpose; R represents the array sampling covariance matrix; I represents an identity matrix;

$$\|\cdot\|_F^2$$

represents a Frobenius norm; ϵ represents hyperparameters of the optimization model.

The determining a multivariable optimization model according to the initial optimization model, includes:

defining a plurality of optimization variables, and characterizing the initial optimization model by using each of the optimization variables to obtain the multivariable optimization model.

An expression of the multivariable optimization model is:

$$\min_{U,V,Z,\gamma,B_i} \frac{1}{2}\sum_{i=1}^{L}\|B_i\|_{p=1}$$

$$s.t.\ \|Z-\hat{R}\|_F^2 \le \epsilon,\ UV^H + \gamma I = Z,\ \mathcal{R}[Q_i[U]] = B_i,\ \forall i \in \{1, \ldots, L\},$$

$$U = V, \gamma \ge 0$$

where $$\min_{U,V,Z,\gamma,B_i}$$

represents optimizing a variable to minimize an objective function; U represents a first target variable; γ represents a second target variable; i represents an index; L represents a quantity of the incident signals; $\mathcal{R}$ represents the Hankel matrix transformation operator; $Q_i$ represents the column extraction operator; p represents a series of the norms; s.t. represents the constraint condition; $(\cdot)^H$ represents a conjugate transpose; $\dot{R}$ represents the array sampling covariance matrix; I represents an identity matrix;

$$\|\cdot\|_F^2$$

represents a Frobenius norm; ϵ represents hyperparameters of the optimization model; Z, V, and $B_i$ are optimization variables.

The solving the multivariable optimization model based on an alternating direction method of multipliers to obtain an optimal result, includes:
  initializing each of the optimization variables and the target variable;
  constructing, based on the multivariable optimization model, an augmented Lagrangian function of the multivariable optimization model;
  performing, based on the alternating direction method of multipliers, iterative updating on each of the optimization variables and the target variable to determine a saddle point of the augmented Lagrangian function; the saddle point is the optimal result of the multivariable optimization model.

An expression of the augmented Lagrangian function is:

$$L_\mu(U, V, Z, \gamma, \mathcal{B}, \mathcal{D}, C, M) = \frac{1}{2}\sum_{i=1}^{L}\|B_i\|_{p=1}$$

$$+\langle C, UV^H + \gamma I - Z\rangle + \frac{\mu}{2}\|UV^H + \gamma I - Z\|_F^2$$

$$+\sum_{i=1}^{L}\left(\langle D_i, \mathcal{R}Q_i\ U - B_i\rangle + \frac{\mu}{2}\|\mathcal{R}Q_i U - B_i\|_F^2\right)$$

$$+\langle M, U - V\rangle + \frac{\mu}{2}\|U - V\|_F^2$$

$$s.t.\ \|Z-\hat{R}\|_F^2 \le \epsilon, \gamma \ge 0$$

where $\mathcal{L}_\mu$ represents a Lagrangian function; C, M, and $D_i$ are Lagrangian multipliers, $\langle X, Y\rangle = tr(X''Y)$, tr(•) represents a trace of a matrix; μ is a penalty parameter.

The analyzing the optimal result to obtain a direction of arrival of the target incident signal includes:
  obtaining an optimal first target variable from the optimal result, and determining the direction of arrival of the target incident signal according to the optimal first target variable.

To achieve the mentioned purpose, the present disclosure further provides a computer device, including a memory, a processor, and a computer program stored in the memory and executable on the processor, the processor executes the computer program to implement steps of the direction of arrival estimation method based on steering vector matrix reconstruction.

Based on embodiments of the present disclosure, beneficial effects of the present disclosure include:

The present disclosure sets a first target variable satisfying a Vandermonde structure, constraints the first target variable according to structural characteristics of antenna array signals, constructs an objective function of a multivariable model and solves the objective function, thereby obtaining an optimal target variable, and analyzing the optimal target variable to obtain a direction of arrival of an incident signal. The present disclosure can estimate the DoA of the incident signal based on the array antennas under a condition that the angle separation of the incident signal is small, and improve estimation accuracy.

BRIEF DESCRIPTION OF THE DRAWINGS

In order to more clearly explain the technical schemes in the embodiments of the present disclosure, brief description of the accompanying drawings needed in the embodiments are briefly introduced below. Obviously, the drawings in the following description are only some embodiments of the present disclosure, and other drawings can be obtained according to these drawings without creative labor for those skilled in the field.

DETAILED DESCRIPTION OF EMBODIMENTS

In order to make the purposes, technical schemes, and effects of the present disclosure more clear and definite, the present disclosure is further described in detailed below with reference to the embodiments and the accompanying drawings. It should be understood that the embodiments described herein are only parts of the embodiments, and not all embodiments. Based on the embodiments, all other embodiments obtained by those skilled in the art without creative labor still belong to the scope of protection of the present disclosure.

The purpose of the present disclosure is to provide a direction of arrival estimation method and device based on steering vector matrix reconstruction to perform DoA estimation of incident signals based on array antennas when the angular separation of the incident signals is small, thereby improving the accuracy of the DoA estimation.

In order to make the above-mentioned objects, features and advantages of the present disclosure more obvious and easier to understand, the present disclosure is further described in detail below with reference to the accompanying drawings and specific embodiments.

Embodiment 1

Figure 1:
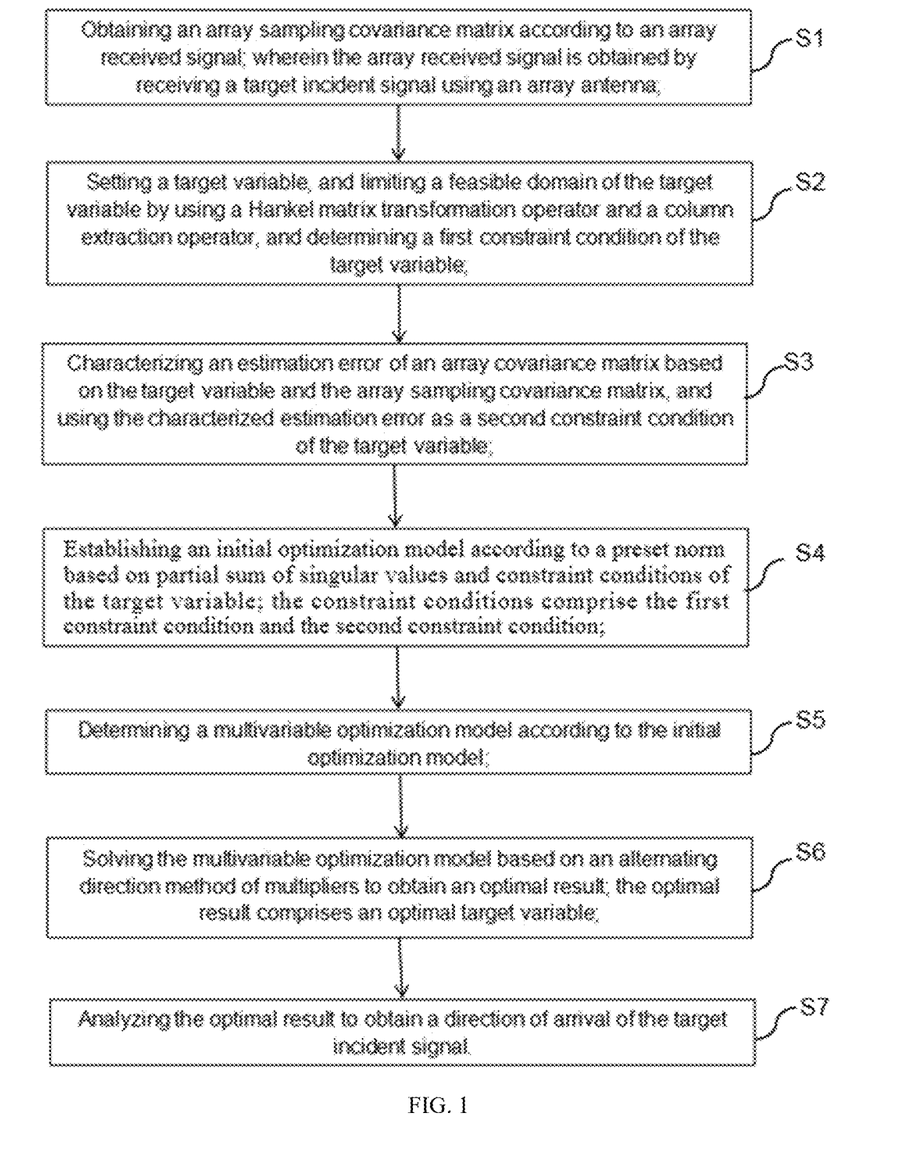
FIG. 1 is a schematic flow chart of a direction of arrival estimation method based on steering vector matrix reconstruction provided in Embodiment 1 of the present disclosure.

As shown in FIG. 1, a direction of arrival estimation method based on steering vector matrix reconstruction includes the following steps:

S1, obtaining an array sampling covariance matrix according to an array received signal; the array received signal is obtained by receiving a target incident signal using an array antenna.

S2, setting a target variable, and limiting a feasible domain of the target variable by using a Hankel matrix transformation operator and a column extraction operator, and determining a first constraint condition of the target variable; the Hankel matrix transformation operator is configured to transform a vector into a Hankel matrix; the column extraction operator is configured to extract columns of a matrix. The step S2 also includes setting a first target variable U and a second target variable $\gamma$.

S3, characterizing an estimation error of an array covariance matrix based on the target variable and the array sampling covariance matrix, and using the characterized estimation error as a second constraint condition of the target variable; the array covariance matrix is composed of the array sampling covariance matrix and the estimation error of the array covariance matrix. The step S3 includes: S31, characterizing the array covariance matrix according to the target variable; S32, characterizing the estimation error of the array covariance matrix according to the characterized array covariance matrix and the array sampling covariance matrix; S33, calculating norms of the estimation error to obtain the second constraint condition of the target variable.

S4, establishing an initial optimization model according to a preset norm based on partial sum of singular values and constraint conditions of the target variable; the constraint conditions comprise the first constraint condition, the second constraint condition and a third constraint condition. The step S4 includes: S41: replacing the first constraint condition with the preset singular value and norm to obtain a first objective function. S42: determining the objective function of the initial optimization model according to the second constraint condition and the first objective function. The second target variable $\gamma \geq 0$, and represents a noise power, and $\gamma \geq 0$ is used as the third constraint condition.

S5, determining a multivariable optimization model according to the initial optimization model, which specifically includes: defining a plurality of optimization variables, and characterizing the initial optimization model by using each of the optimization variables to obtain the multivariable optimization model.

S6, solving the multivariable optimization model based on an alternating direction method of multipliers to obtain an optimal result; the optimal result includes an optimal target variable. The step S6 includes: S61, initializing each of the optimization variables and the target variable; S62, based on the multivariable optimization model, constructing an augmented Lagrangian function of the multivariable optimization model; S63, based on the alternating direction method of multipliers, performing iterative updating on each of the optimization variables and the target variable to determine a saddle point of the augmented Lagrangian function; the saddle point is the optimal result of the multivariable optimization model.

S7, analyzing the optimal result to obtain a direction of arrival of the target incident signal. The step S7 includes: obtaining an optimal first target variable from the optimal result, and determining the direction of arrival of the target incident signal according to the optimal first target variable.

Furthermore, the step S1 includes:

Expressing the array sampling covariance matrix as:

$$\hat{R} = \frac{1}{K}\sum_{t=1}^{K} x(t)x^H(t), \quad (1)$$

where K represents a quantity of samples in a time domain, also called the number of snapshots.

Further, considering narrowband non-correlated far-field signals L(L<M) with incident angles of $\theta_1, \theta_2, \ldots, \theta_L$ which are received by a uniform linear array composed of M antenna elements with adjacent spacing of d. The array received signal x(t) can be modeled as:

$$x(t) = \sum_{l=1}^{L} a(\theta_l)s_l(t) + n(t) = As(t) + n(t), \quad (2)$$

where $s(t)=[s_1(t), s_2(t), \ldots, s_L(t)]^T$, s(t) is the L×1 dimensional vector of the spatial signal, t is the sampling time, $(\bullet)^T$ represents the transpose, n(t) represents the M×1 dimensional noise vector, A is the M×L dimensional matrix and represents the array steering vector matrix, and the form of A is:

$$A=[a(\theta_1), a(\theta_2), \ldots, a(\theta_L)], \quad (3)$$

Where $a(\theta_l)$ is the steering vector with an angle of $\theta_l$, expressed as:

$$a(\theta_l) = \left[1, e^{j\frac{2\pi}{\lambda}d\sin\theta_l}, \ldots, e^{j\frac{2\pi}{\lambda}d(M-1)\sin\theta_l}\right]^T, \quad (4)$$

where $\lambda$ represents a wavelength of the incident signal, e is the base of the natural logarithm, j is the imaginary number sign, and d represents the adjacent spacing of antenna array elements.

The signal covariance matrix is a L×L dimensional diagonal matrix, expressed as:

$$R_S = E\{s(t)s^H(t)\} \quad (5)$$

where $E\{\bullet\}$ represents the mathematical expectation, and $(\bullet)^H$ represents the conjugate transpose.

Considering an ideal case, the array covariance matrix R can be decomposed into a noise-free array covariance matrix $R_0$ and a diagonal noise covariance matrix $R_N$.

Furthermore, assuming that the sensor noise is zero-mean Gaussian noise that is uncorrelated in space M×M dimensional noise covariance matrix $R_N$ is defined as:

$$R_N = E\{n(t)n^H(t)\} = \sigma_n^2 I, \quad (6)$$

where $$\sigma_n^2$$

represents the noise power, and I is the M×M dimensional unit matrix. Further, the array covariance matrix R can be expressed as:

$$R = E\{x(t)x^H(t)\} = R_0 + R_N = AR_S A^H + \sigma_n^2 I, \quad (7)$$

Where $R_0$ is the noise-free array covariance matrix, which is in the form of:

$$R_0 AR_S A^H = \begin{bmatrix} 1 & \cdots & 1 \\ e^{j\beta\sin\theta_1} & \cdots & e^{j\beta\sin\theta_L} \\ \vdots & \vdots & \vdots \\ e^{j\beta(M-1)\sin\theta_1} & \cdots & e^{j\beta(m-1)\sin\theta_L} \end{bmatrix} \begin{bmatrix} p_1^2 & & \\ & p_2^2 & \\ & & \ddots \\ & & & p_L^2 \end{bmatrix} \quad (8)$$

-continued $$\begin{bmatrix} 1 & \cdots & 1 \\ e^{j\beta\sin\theta_1} & \cdots & e^{j\beta\sin\theta_L} \\ \vdots & \vdots & \vdots \\ e^{j\beta(M-1)\sin\theta_1} & \cdots & e^{j\beta(m-1)\sin\theta_L} \end{bmatrix} =$$

$$A \begin{bmatrix} p_1 e^{j\phi_1} p_1^* e^{-j\phi_1} & & & \\ & p_2 e^{j\phi_2} p_2^* e^{-j\phi_2} & & \\ & & \ddots & \\ & & & p_L e^{j\phi_L} p_L^* e^{-j\phi_L} \end{bmatrix} A^H =$$

$$AEE^H A^H = (AE)(AE)^H = UU^H,$$

where $$\beta = \frac{2\pi}{\lambda}d,$$

$p_l^2$ represents a power of the l-th signal, $\phi_l$ represents a constant, and $(\bullet)^*$ represents a conjugate operation. Obviously, $R_S$ is a real diagonal matrix, which can be decomposed into two mutually conjugate transposed diagonal matrices, namely $EE^H$ in Formula (8). The l-th column of U is equivalent to the corresponding steering vector multiplied by a constant. In the present disclosure, the matrix decomposition method corresponding to Formula (8) is called the Vandermonde Decomposition of Toeplitz matrix, where U has a Vandermonde structure.

The present disclosure needs to find a matrix U that satisfies the Vandermonde structure and the formula, but it is difficult to directly add the constraints of the Vandermonde structure to U, because a set of the Vandermonde matric is non-convex and highly nonlinear, which makes the constructed optimization problem difficult to solve. The Vandermonde structure can be realized by forcing each column of the matrix to be an exponential function. If an exponential sequence is transformed into a Hankel matrix, the rank of the Hankel matrix is 1. Since has a Vandermonde structure, each column of U is transformed into a Hankel matrix of rank 1. Therefore, the target variable is set through step S2, and the target variable is constrained.

Furthermore, the step S2 includes:

The Hankel matrix transformation operator $\mathcal{R}$, which means mapping the n×1 dimensional vector x to the (n−m+1)×m dimensional Hankel matrix $\mathcal{R}[x]$, that is $\mathcal{R}[x]_{(i,j)} = x_{i+j-1}$, means the (i+j−1)-th element of x is equal to the element of the i-th row and j-th column of $\mathcal{R}[x]$. The adjoint operator $\mathcal{R}*$ of $\mathcal{R}$, which means mapping the (n−m+1)×m dimensional matrix X to the n×1 dimensional vector $\mathcal{R}*[X]$, that is $$[\mathcal{R}^*X]_k = \sum_{i+j-1=k} X_{ij},$$

means the k-th element of $\mathcal{R}*X$ is equal to the sum of the elements in X having the sum of the row and column subscripts equal to k+1. The column extraction operator $Q_i$, which means extracting the i-th column of the matrix, that is $Q_i[X] = X_{(1,i)}$. The adjoint operator $Q^*_i$ of $Q_i$, which means mapping the n×1 dimensional vector x to the n×m dimensional matrix, is defined as:

$$Q_i^*[x]_{(:,k)} = \begin{cases} x, & k = i \\ 0, & k \neq i \end{cases} \forall i \in \{1, \ldots, m\}, \quad (9)$$

where i represents the meaning of index and number, and $\forall i \in \{1, \ldots, m\}$ represents the values of i are $1, \ldots, m$.

Ideally, the array covariance matrix R can be decomposed into the noise-free array covariance matrix $R_0$ and the diagonal noise covariance matrix $\gamma I$, where $\gamma \geq 0$ and represents the noise power. Taking advantage of the fact that $R_0$ has a rank of L and is semi-positive definite, $UU^H$ is configured to replace $R_0$, that is $R_0 = UU^H$. At the same time, U has a Vandermonde structure, so the operators $\mathcal{R}$ and Q are used to impose constraints on U, that is rank($\mathcal{R}$ [$Q_i$ [U]])= 1, representing the first constraint condition; where rank(•) represents the rank of the matrix. The problem constructed at this time is to find a U and $\gamma$ under certain constraints, which is in the form of:

Find $U, \gamma$ (10)
s.t. rank($\mathcal{R}[Q_i[U]]) = 1, \forall i \in \{1, \ldots, L\}, R = UU^H + \gamma I, \gamma \geq 0$, where $U \in \mathbb{C}^{M \times L}$, $\mathbb{C}$ represents a complex set matrix, U is a M×L dimensional complex matrix, Find represents finding the variables that satisfy the constraints, and s.t. is configured to limit the feasible domain of the optimization variables.

In practical applications, only the array sampling covariance matrix under finite snapshots can be obtained. Due to the existence of errors, it is obvious that $\hat{R} \neq UU^H + \gamma I$. In other words, the estimation error of the array covariance matrix can be used to constrain the target variable.

Furthermore, the step S3 includes:
Expressing the characterized array covariance matrix R as:

$$R = UU^H + \gamma I, \quad (11)$$

The estimation error E of the array covariance matrix E is expressed as:

$$E = R - \hat{R} = UU^H + \gamma I - \hat{R}, \quad (12)$$

where E includes the signal cross-correlation term and the noise cross-correlation term, and is not equal to 0. Further, the norm of the estimation error is calculated, and the equality constraint $R = UU^H + \gamma I$ is changed to the inequality constraint $$\|E\|_F^2 \leq \epsilon,$$

that is, the second constraint condition of the target variable is $$\|UU^H + \gamma I - \hat{R}\|_F^2 \leq \epsilon,$$

where $$\| \cdot \|_F^2$$

represents the Frobenius norm, and $\epsilon$ is the hyperparameter of the optimization model, and a preset size depends on the quantity of snapshots and SNR.

Furthermore, the step S4 includes:
Because the signal covariance matrix is not a diagonal matrix in the case of finite snapshots, the target variable U does not strictly have a Vandermonde structure. The data in the first column of U contains not only the components $p_1 e^{j\phi_1}[1, e^{j\beta \sin \theta_2}, \ldots, e^{j\beta(M-1) \sin \theta_2}]^T$ of the first signal, but also smaller components of other signals. After transformed into a Hankel matrix and subjected to singular value decomposition, a large singular value and other smaller singular values are obtained. The size of the singular value depends on the signal power and cross-correlation terms contained in the signal sampling covariance matrix $R_S$.

Therefore, the norm based on preset partial sum of singular values (PSSV) is:

$$\|Y\|_p = \sum_{i=p+1}^{min(m,n)} \sigma_i(Y),$$

where $Y \in \mathbb{C}^{m \times n}$, $\Sigma$ is a sum symbol, and $\sigma_i$ represents the i-th value of the singular values Y of in a descending order. Making the series in the norm based on PSSV be p=1, that is $\|Y\|_{p=1}$, replacing the equality constraint rank ($\mathcal{R}$ [$Q_i$ [U]])= 1 with which is taken as the objective function of the optimization problem (i.e., the first objective function), allowing the rank of $\mathcal{R}$ [$Q_i$[U]] to be non-1, and except for the largest singular value, the other singular values are non-0. Therefore, the expression of the optimization model of the problem is:

$$\min_{U, \gamma} \frac{1}{2} \sum_{i=1}^{L} \|\mathcal{R}[Q_i[U]]\|_{p=1} \text{ s.t. } \|UU^H + \gamma I - \hat{R}\|_F^2 \leq \epsilon, \gamma \geq 0, \quad (13)$$

where $$\min_{U, \gamma}(\cdot)$$

represents optimizing a variable to minimize an objective function; U represents a first target variable; $\gamma$ represents a second target variable; i represents an index; L represents a quantity of the incident signals; $\mathcal{R}$ represents the Hankel matrix transformation operator; $Q_i$ represents the column extraction operator; p represents a series of the norms; s.t. represents the constraint condition; $(\cdot)^H$ represents a conjugate transpose; $\hat{R}$ represents the array sampling covariance matrix; I represents an identity matrix;

$$\| \cdot \|_F^2$$

represents a Frobenius norm; $\epsilon$ represents hyperparameters of the optimization model.

Furthermore, the step S5 includes:
Rewriting, in order to solve the optimization problem conveniently, Formula (13) as Formula (14), and obtaining the expression of the multivariable optimization model as follows:

$$\min_{U,V,X,\gamma,B_i} \frac{1}{2}\sum_{i=1}^{L} \|B_i\|_{p=1} \quad (14)$$

$$\text{s.t. } \|Z - \hat{R}\|_F^2 \leq \epsilon,\ UV^H + \gamma I = Z,\ \mathcal{R}[Q_i[U]] = B_i,\ \forall\, i \in \{1, \ldots, L\},$$

$$U = V,\ \gamma \geq 0$$

where $$\min_{U,V,Z,\gamma,B_i}$$

represents optimizing a variable to minimize an objective function; U represents a first target variable; σ represents values of singular values; γ represents a second target variable; i represents an index; L represents a quantity of the incident signals; $\mathcal{R}$ represents the Hankel matrix transformation operator; $Q_i$ represents the column extraction operator; p represents a series of the norms; s.t. represents the constraint condition; $(\cdot)^H$ represents a conjugate transpose; $\hat{R}$ represents the array sampling covariance matrix; I represents an identity matrix;

$$\|\cdot\|_F^2$$

represents a Frobenius norm; ϵ represents hyperparameters of the optimization model; Z, V, and $B_i$ are optimization variables.

Furthermore, the step S6 includes:

Solving the above multivariable optimization problem by the Alternating Direction Method of multipliers (ADMM). Making $\mathcal{B} = (B_1, \ldots, B_L)$, $\mathcal{D} = (D_1, \ldots, D_L)$, and the expression of the augmented Lagrangian function obtained according to the multivariable optimization model is:

$$\mathcal{L}_p(U, V, Z, \gamma, B, D, C, M) = \frac{1}{2}\sum_{i=1}^{L} \|B_i\|_{p=1}$$
$$+ \langle C, UV^H + \gamma I - Z \rangle + \frac{\mu}{2}\|UV^H + \gamma I - Z\|_F^2$$
$$+ \sum_{i=1}^{L} \langle D_i, \mathcal{R}Q_i U - B_i \rangle + \frac{\mu}{2}\|\mathcal{R}Q_i U - B_i\|_F^2$$
$$+ \langle M, U - V \rangle + \frac{\mu}{2}\|U - V\|_F^2$$

$$\text{s.t. } \|Z - \hat{R}\|_F^2 \leq \epsilon,\ \gamma \geq 0,$$

where $\mathcal{L}_\mu$ represents the Lagrangian function; C, M, and $D_i$ are Lagrangian multipliers; $\langle X, Y \rangle = \text{tr}(X^H Y)$, tr(•) represent the trace of the matrix; μ is the penalty parameter, that is, the hyperparameters of ADMM.

Furthermore, it is necessary to approximately solve problem (14) by finding a saddle point of the augmented Lagrangian function, and the saddle point is the optimal result of the multivariable optimization model. Therefore, the augmented Lagrangian function $\mathcal{L}_\mu$ is minimized in turn through the following ADMM iteration scheme to obtain the saddle point of the augmented Lagrangian function.

$$\min_U \mathcal{L}_\mu(U, V^k, Z^k, \gamma^k, \beta^k, \mathcal{D}^k, C^k, M^k), \quad (16)$$

$$\min_V \mathcal{L}_\mu(U^{k+1}, V, Z^k, \gamma^k, \beta^k, \mathcal{D}^k, C^k, M^k), \quad (17)$$

$$\min_Z \mathcal{L}_\mu(U^{k+1}, V^{k+1}, Z, \gamma^k, \beta^k, \mathcal{D}^k, C^k, M^k), \quad (18)$$

$$\text{s.t. } \|Z - \hat{R}\|_F^2 \leq \epsilon,$$

$$\min_\gamma \mathcal{L}_\mu(U^{k+1}, V^{k+1}, Z^{k+1}, \gamma, \beta^k, \mathcal{D}^k, C^k, M^k), \quad (19)$$

$$\min_\beta \mathcal{L}_\mu(U^{k+1}, V^{k+1}, Z^{k+1}, \gamma^{k+1}, \beta, \mathcal{D}^k, C^k, M^k), \quad (20)$$

$$D_i^{k+1} = D_i^k + \mu^k (\mathcal{R}[Q_i[U^{k+1}]] - B_i^{k+1}) \quad (21)$$

$$\forall\, i \in \{1, \ldots, L\},$$

$$C^{k+1} = C^k + \mu^k (U^{k+1}(V^{k+1})^H + \gamma^{k+1} I - Z^{k+1}), \quad (22)$$

$$M^{k+1} = M^k + \mu^k (U^{k+1} - V^{k+1}), \quad (23)$$

Before the iterative update begins, the optimization variables need to be initialized. Perform singular value decomposition on $\hat{R}$, $\hat{R} = OSP^H$, where O is a left singular vector matrix, P is a right singular vector matrix, S is a diagonal matrix, and diagonal elements of S are singular values. Set the initial value of the variable V to $$V^0 = P_{(:,1:L)} \sqrt{S_{(1:L,1:L)}^H}.$$

Furthermore, the performing iterative updating on each of the optimization variables and the target variable to determine a saddle point of the augmented Lagrangian function, specifically includes the following steps:

(1) Updating the First Target Variable U:

In order to update U, it is necessary to solve subproblem (16), which can be expressed as:

$$\min_U \left\| U(V^k)^H + \gamma^k I - Z^k + \frac{1}{\mu^k} C^k \right\|_F^2 + \quad (24)$$
$$\sum_{i=1}^{k} \left\| \mathcal{R}[Q_i[U^k]] - B_i^k + \frac{1}{\mu^k} D_i^k \right\|_F^2 + \left\| U - V^k + \frac{1}{\mu^k} M^k \right\|_F^2,$$

Formula (24) is a least squares problem. Defining the conjugate matrix U* of U, making the partial derivative of the objective function with respect to U* be 0 to obtain:

$$U(V^k)^H V^k + \sum_{i=1}^{L} Q_i^p \left[ \mathcal{R}^*[\mathcal{R}[Q_i[U]]] + U = \right. \quad (25)$$

$$Z^k V^k - \gamma^k V^k + V^k - \frac{1}{\mu^k} M^k - \frac{1}{\mu^k} C^k V^k + \sum_{i=1}^{L} Q_i^* \mathcal{R}^* \left( B_i^k - \frac{1}{\mu_i} D_i^k \right),$$

According to the definition of operators $\mathcal{R}$ and $\mathcal{R}^*$ to obtain:

$$\mathcal{R}^*[\mathcal{R}[x]] = w \odot x, \quad (26)$$

where w is a vector with k-th element is the number of elements on the k-th anti-diagonal of the Hankel matrix $\mathcal{R}[x]$, and $\odot$ represents the Hadamard product. Combining the definitions of $Q_i$ and $$Q_i^*, \sum_{i}^{L} Q_i^*[\mathcal{R}^*[\mathcal{R}[Q_i[U]]]] = T \odot U$$

is obtained, where T is a matrix with each column is w. Simply put, the formula is equivalent to multiplying each column of U by a constant. Therefore, Formula (25) can be expressed as:

$$U_{(i,:)}(V^k)^H V^k + U_{(i,:)} T_i + U_{(i,:)} = Y_{(i,:)}, \quad (27)$$

where $T_i$ is a diagonal matrix, the elements on main diagonal of which are $T_{(i,:)}$. Y is the right side of Formula (25). Therefore, the closed-form analytical scheme for each row of U can be obtained as:

$$U_{(i,:)}^{k+1} = Y_{(i,:)} \left( (V^k)^H V^k + T_i + I \right)^{-1}, \quad (28)$$

(2) Updating Optimization Variable V:

Subproblem (17) can be expressed as:

$$\min_{V} \left\| U^{k+1} V^H + \sigma^k I - Z^k + \frac{1}{\mu^k} C^k \right\|_F^2 + \left\| V - U^{k+1} - \frac{1}{\mu^k} M^k \right\|_F^2, \quad (29)$$

Similar to updating U, the closed-form analytical scheme of V can be obtained as:

$$V^{k+1} = \quad (30)$$

$$\left( \left( (Z^k)^H + I - \sigma^k I - \frac{1}{\mu^k} (C^k)^H \right) U^{k+1} + \frac{1}{\mu^k} M^k \right) \left( (U^{k+1})^H U^{k+1} + I \right)^{-1},$$

(3) Updating Optimization Variable Z:

In order to update Z, problem (18) needs to be solved, which can be expressed as:

$$\min_{X} \|N - Z\|_F^2 \text{ s.t. } \|Z - \hat{R}\|_F^2 \leq \epsilon, \quad (31)$$

where $N = U^{k+1}(V^k)^H + \sigma^k I + 1/\mu^k C^k$.

According to the derivation, the solve of (31) is:

$$Z^{k+1} = \frac{N + \lambda \hat{R}}{1 + \lambda}, \quad (32)$$

where $$\lambda = \max\left( \frac{\|R - N\|_F}{\sqrt{\epsilon} - 1}, 0 \right),$$

and max(•) represents finding the maximum value.

(4) Updating the Second Target Variable $\gamma$:

To update $\gamma$ the following constrained least squares problem needs to be solved:

$$\min_{\gamma} \left\| Z^{k+1} - U^{k+1}(V^{k+1})^H - \frac{1}{\mu^k} C^k - \gamma I \right\|_F^2 \text{ s.t. } \gamma \geq 0, \quad (33)$$

Obviously, the solve of (33) is:

$$\gamma = \begin{cases} \frac{1}{M} \sum_{i=1}^{M} \mathcal{D}_i\{Q\}, & \sum_{i=1}^{M} \mathcal{D}_i\{Q\} \geq 0 \\ 0, & \sum_{i=1}^{M} \mathcal{D}_i\{Q\} \end{cases}, \quad (34)$$

where $Q = Z^{k+1} - U^{k+1}(V^{k+1})^H - 1/\mu^k C^k$, the i-th element on the main diagonal of the matrix is obtained by $\mathcal{D}_i\{\bullet\}$.

(5) Updating Optimization Variable $B_i$

In order to update $B_i$, the following problem needs to be solved:

$$\min_{B_i} \frac{1}{2} \|B_i\|_{p=1} + \frac{\mu^k}{2} \left\| \mathcal{R} Q_i U^{k+1} + \frac{1}{\mu^k} D_i^k - B_i \right\|_F^2, \quad (35)$$

Defining the partial singular value thresholding (PSVT) operator $$\mathbb{P}_{N,\tau}[Y] = U_1 D_1 V_1^H + U_1 \mathcal{S}_\tau[D_2] V_1^H,$$

where $Y \in \mathbb{C}^{m \times n}$, $l = \min(m, n)$; $\mathcal{S}_\tau[x] = \text{sign}(x) \cdot \max(|x| - \tau, 0)$ is a soft threshold operator, where $\text{sign}(x)$ is a sign function, Y can be decomposed into $$Y = U_1 D_1 V_1^H + U_2 D_2 V_2^H$$

by singular value decomposition, $U_1$ and $V_1$ are the singular vectors corresponding to N largest singular value, $U_2$ and $V_2$ are the singular vector corresponding to the l–N smallest singular value, $D_1$ diag($\sigma_1, \ldots, \sigma N, 0, \ldots, 0$), $D_2 = $ diag($0, \ldots, 0, \sigma_{N+1}, \ldots, \sigma_1$), where diag (•) indicates that a diagonal matrix is constructed using the elements in the brackets. The partial singular value thresholding operator provides a global optimal scheme to problem (35), so the optimal scheme to problem (35) can be expressed as:

$$B_i^{k+1} = \mathbb{P}_{1,1/2\mu^k}\left[\mathcal{R}Q_i U^{k+1} + \frac{1}{\mu^k}D_i^k\right], \qquad (36)$$

In the method of the present disclosure, the maximum number of iterations is set to 400. The iterative process can accelerate convergence by adjusting the hyperparameter μ. In the last 100 iterations, the strategy of $\mu^{k+1}=\rho\mu^k$ is adopted to increase μ, while the initial value of μ is set to $\mu^0=10^{-4}$ and is ρ taken as 1.05. The iterative optimization framework of the steps of performing iterative updating on each of the optimization variables and the target variable to determine a saddle point of the augmented Lagrangian function is as follows:

(1) Initializing Variable:

U, V, Z, $D_i$, $B_i$, $\forall i \in \{1, \ldots, L\}$, C, M, γ, $\mu^B=10^{-4}$, ρ=1.05, k=0

When k<400, executing:

Updating U according to formula (28).
Updating V according to formula (30).
Updating Z according to formula (32).
Updating γ according to formula (34).
For i=1, ..., L, updating $B_i$ according to formula (36).
For i=1, ..., L, updating $D_i$ according to formula (21).
Updating C,M according to formula (22) and formula (23).
If k>300, then updating μ by $\mu^{k+1}=\rho\mu^k$.
k=k+1.

Outputting variables: U, V, and γ where U and γ are the defined target variables.

Furthermore, the step S7 includes:

When the maximum number of iterations is reached, the first target variable U is obtained and output. Since each column of U mainly contains the components of a single frequency signal and smaller components of other signals, which is regarded as noise. Taking the first signal as an example, the first column of U is expressed as:

$$u_1 = \begin{pmatrix} p_1 e^{j\phi_1} + \Delta_1 \\ \eta p_1 e^{j\phi_1} e^{j\beta\sin\theta_1} + \Delta_2 \\ \vdots \\ \eta^M p_1 e^{j\phi_1} e^{j\beta(M-1)\sin\theta_1} + \Delta_M \end{pmatrix}, \qquad (37)$$

where $\Delta_1, \Delta_2, \ldots, \Delta_M$ are the noise terms, and η represents a constant. Since an amplitude of the noise term is very small the second row in the first column is divided by the first row, which is $u_2(2)/u_1(1)$ and can be expressed as:

$$\frac{\eta p_1 e^{j\phi_1} e^{j\beta\sin\theta_1} + \Delta_2}{p_1 e^{j\phi_1} + \Delta_1} = \frac{\frac{\eta p_1 e^{j\phi_1} e^{j\beta\sin\theta_1}}{p_1} + \frac{\Delta_2}{p_1}}{\frac{p_1 e^{j\phi_1}}{p_1} + \frac{\Delta_1}{p_1}} \approx \eta e^{j\beta\sin\theta_1}, \qquad (38)$$

The above method can be used to obtain an estimation result of the first signal. Similarly, by dividing the (m+1)-th term of u by the m-th term, where 1≤m≤M−1, M−1 estimation results $\Lambda_1 \sim \Lambda_{M-1}$ are obtained, and taking an average of the M−1 estimation results to obtain the final result $\overline{\Lambda}$, so the final DoA estimation value $\hat{\theta}$ is:

$$\hat{\theta} = \arcsin\frac{\varphi(\overline{\Lambda})}{j\beta}, \qquad (39)$$

where φ(•) represents calculating a phase of the complex number.

Beneficial Effects of the Present Disclosure

At present, the angular resolution of the gridless DoA estimation method is still not high under low SNR conditions. In actual work, targets with small angular separation are inevitable. Existing methods usually cannot successfully distinguish similar targets and have poor estimation accuracy. The present disclosure is based on an array antenna, and aims to improve the ability to distinguish targets with small angular separation and improve estimation accuracy.

Embodiment 2

The method proposed in the present disclosure is simulated and tested below. An 8-element uniform linear array is used, and a spacing between adjacent antenna elements is half the wavelength of the incident signal. First, it is necessary to normalize $\hat{R}$, and the normalization method is to divide $\hat{R}$ by the maximum amplitude of all elements, which is used as the input variable of the optimization model. At the same time, the method requires prior knowledge of the number of signal sources to determine the dimension size of the variable matrix U. In order to evaluate the angle estimation accuracy of the algorithm, Root Mean Square Error (RMSE) is defined as:

$$RMSE(\theta) = \sqrt{\frac{1}{NL}\sum_n^N\sum_l^L(\hat{\theta}_{n,l} - \theta_l)^2}, \qquad (40)$$

wherein N represents the number of Monte Carlo experiments, L represents the quantity of incident signals, $\hat{\theta}_{n,l}$ represents the l-th estimated angle of the n-th experiment, and $\theta_l$ represents the true angle of the incident signal.

Figure 2:
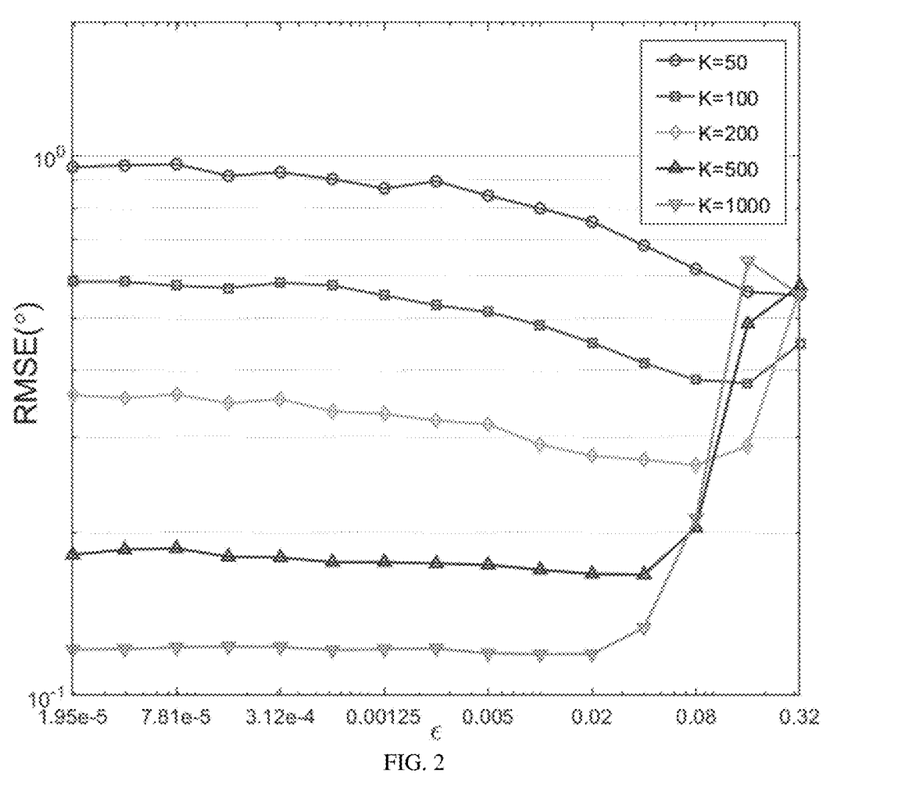
FIG. 2 is a schematic diagram of a variation curve of RMSE with the parameter $\epsilon$ in Embodiment 2 of the present disclosure.

The angle of the incident signal is set to −5° and 5°, the SNR is 0 dB, and the quantity of time domain samples (snapshots) is set to 50, 100, 200, 500, and 1000, respectively, and 2000 Monte Carlo experiments are performed. Attached FIG. 2 shows the RMSE curve with the change of parameter ∈. It can be seen from FIG. 2 that the smaller the quantity of snapshots, the larger the parameter set to achieve the minimum RMSE.

Figure 3:
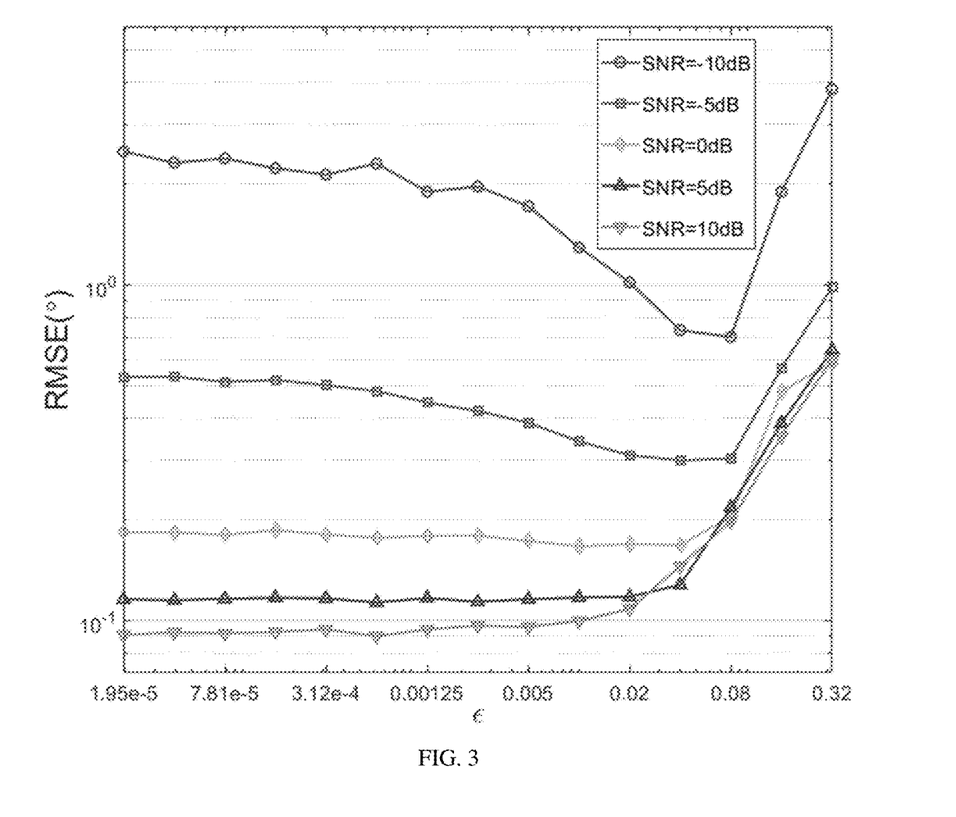
FIG. 3 is another schematic diagram of a variation curve of RMSE with the parameter $\epsilon$ in Embodiment 2 of the present disclosure.

The angle of the incident signal is set to −5° and 5°, the quantity of time domain samples is 500, the SNR is set to −10 dB, −5 dB, 0 dB, 5 dB, 10 dB, respectively, and 2000 Monte Carlo experiments are performed. Attached FIG. 3 shows the RMSE curve with the change of parameter ∈. It can be seen from FIG. 3 that the lower the SNR, the larger the parameter set to achieve the minimum RMSE.

Figure 4:
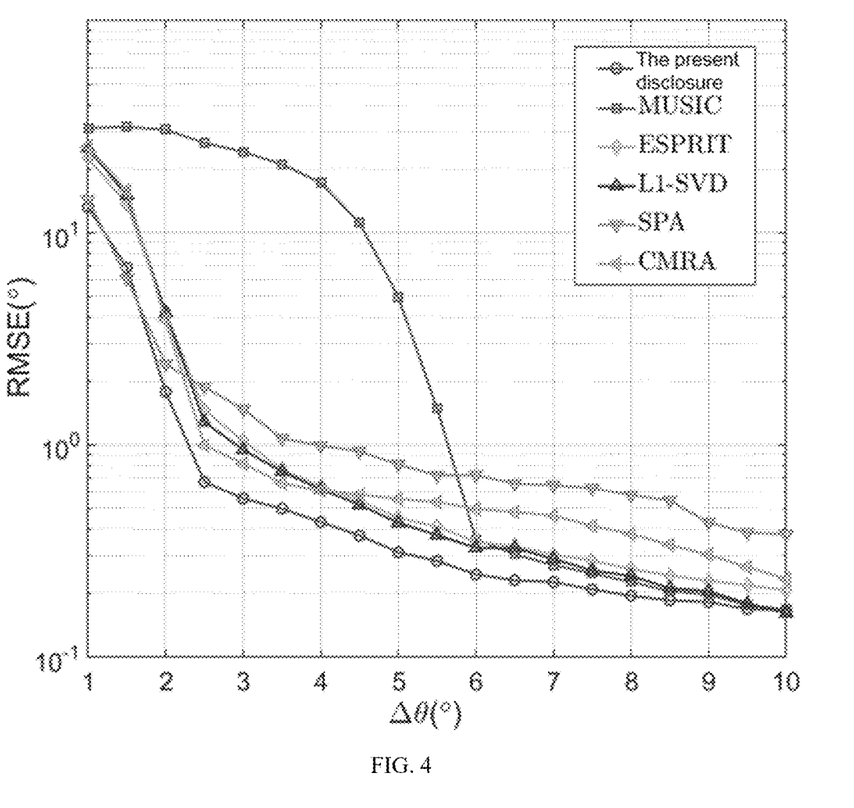
FIG. 4 is a schematic diagram of a variation curve of the RMSE with the separation angle $\Delta\theta$ of two signals in Embodiment 2 of the present disclosure.

The resolution performance of the technical scheme of the present disclosure is tested and evaluated below, and the technical scheme of the present disclosure is compared with MUSIC Algorithm, ESPRIT Algorithm, L1-SVD, SPA, and CMRA. The angle of the first incident signal is set to 0°, the angle of the second incident signal is set to 0°+Δθ, the parameter ∈ is set to 0.01, the quantity of time domain samples is 500, and the SNR is 0 dB. In the simulation experiment, the value of Δθ is changed from 1° to 10°, and 500 Monte Carlo experiments are performed. FIG. 4 shows the RMSE curve with Δθ. It can be seen from FIG. 4 that when the separation angle of the incident signal is 1° to 10°, the technical method of the present disclosure has the best estimation performance.

Figure 5:
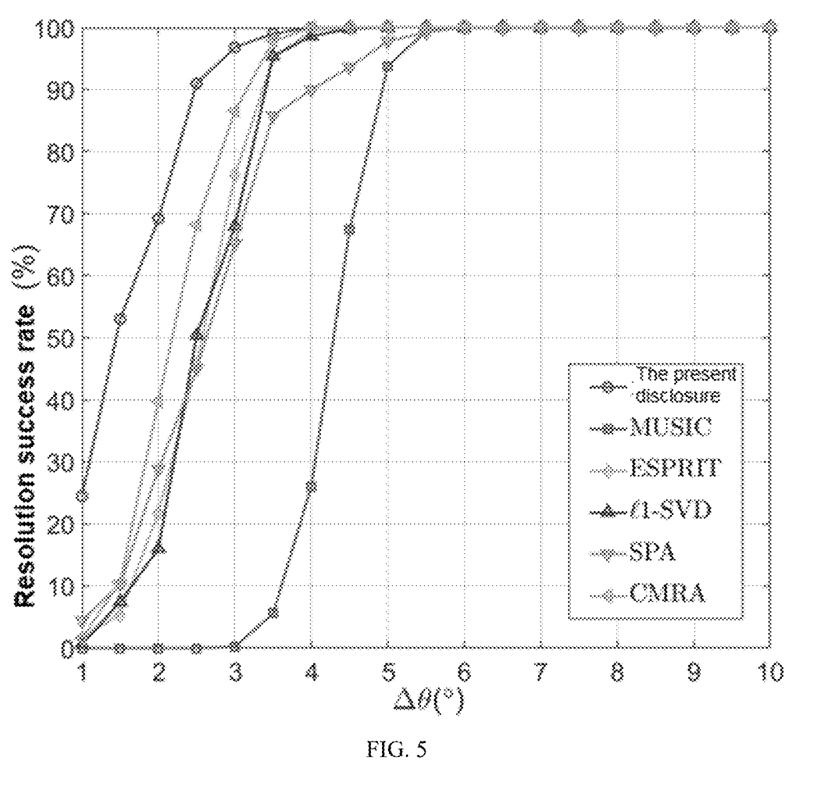
FIG. 5 is a schematic diagram of a variation curve of the resolution success rate with the separation angle $\Delta\theta$ of two signals in Embodiment 2 of the present disclosure.

In order to more intuitively evaluate the resolution performance of the algorithm, the criterion for successful resolution is defined as: for $$l=1,2, |\hat{\theta}_l - \theta_l| < \frac{\Delta\theta}{2},$$

where $\Delta\theta$ represents the interval between two real angles. The resolution success rate is obtained by statistical analysis of 500 Monte Carlo experiments, and FIG. 5 shows the variation curve of the resolution success rate with $\Delta\theta$. It can be seen from FIG. 5 that when the separation angle of the incident signal is 2°, the resolution success rate of the present disclosure is about 70%, while other methods do not exceed 50%. In general, the present disclosure can improve the angular resolution.

In addition, the present disclosure can also be applied to the field of incident angle estimation of phased array radars.

Embodiment 3

A computer device includes a memory, a processor, and a computer program stored in the memory and executable on the processor, where the processor executes the computer program to implement the steps of the direction of arrival estimation method based on steering vector matrix reconstruction in embodiment 1.

Embodiment 4

Figure 6:
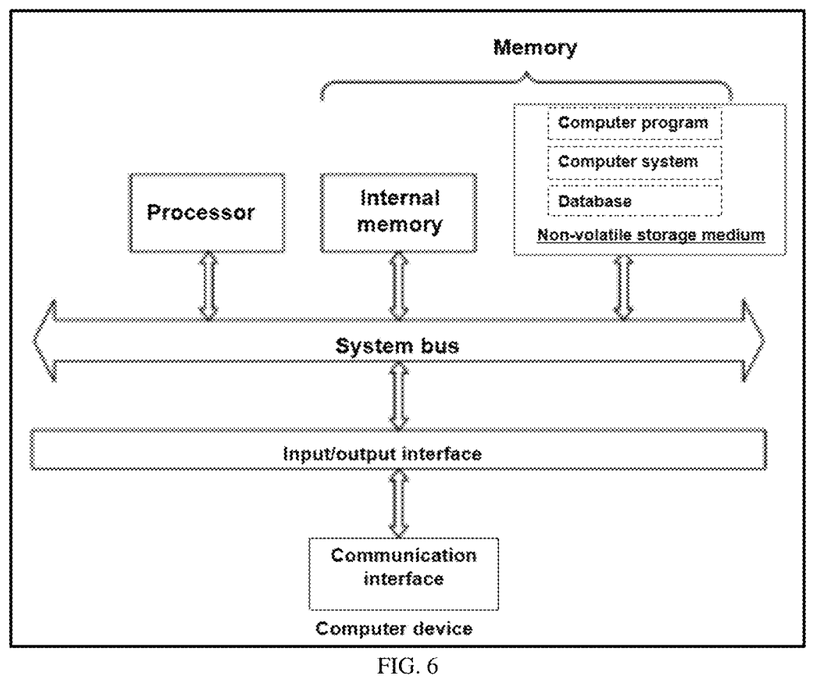
FIG. 6 is a diagram showing the internal structure of a computer apparatus.

A computer apparatus, which may be a database, may have an internal structure diagram as shown in FIG. 6. The computer apparatus includes a processor, a memory, an input/output interface (referred to as I/O) and a communication interface. The processor, the memory and the input/output interface are connected via a system bus, and the communication interface is connected to the system bus via the input/output interface. The processor of the computer apparatus is configured to provide computing and control capabilities. The memory of the computer apparatus includes a non-volatile storage medium and an internal memory. The non-volatile storage medium stores an operating system, a computer program and a database. The internal memory provides an environment for the operation of the operating system and the computer program in the non-volatile storage medium. The database of the computer apparatus is configured to store pending transactions. The input/output interface of the computer apparatus is configured to exchange information between the processor and an external apparatus. The communication interface of the computer apparatus is configured to communicate with an external terminal via a network connection. When the computer program is executed by the processor, the direction of arrival estimation method based on steering vector matrix reconstruction in Embodiment 1 is implemented.

Those skilled in the art can understand that all or part of the processes in the above-mentioned embodiments can be completed by instructing the relevant hardware through a computer program, and the computer program can be stored in a non-volatile computer-readable storage medium. When the computer program is executed, it can include the processes of the embodiments of the above-mentioned methods. Any reference to the memory, database or other medium used in the embodiments provided by the present disclosure can include at least one of non-volatile and volatile memory. Non-volatile memory can include read-only memory (ROM), magnetic tape, floppy disk, flash memory, optical memory, high-density embedded non-volatile memory, resistive random access memory (ReRAM), magnetoresistive random access memory (MRAM), ferroelectric random access memory (FRAM), phase change memory (PCM), graphene memory, etc. Volatile memory can include random access memory (RAM) or external cache memory, etc. As an illustration and not limitation, RAM can be in various forms, such as static random access memory (SRAM) or dynamic random access memory (DRAM). The database involved in each embodiment provided by the present disclosure may include at least one of a relational database and a non-relational database. Non-relational databases may include distributed databases based on blockchains, etc., but are not limited to this. The processor involved in each embodiment provided by the present disclosure may be a general-purpose processor, a central processing unit, a graphics processor, a digital signal processor, a programmable logic apparatus, a data processing logic apparatus based on quantum computing, etc., but are not limited to this.

The technical features of the above embodiments may be arbitrarily combined. To make the description concise, not all possible combinations of the technical features in the above embodiments are described. However, as long as there is no contradiction in the combination of these technical features, they should be considered to be within the scope of this specification. The description uses specific embodiments to illustrate the principles and implementation methods of the present disclosure. The above embodiments are only used to help understand the method and core ideas of the present disclosure. At the same time, for those skilled in the art, according to the ideas of the present disclosure, there will be changes in the specific implementation methods and application scope. In summary, the content of the specification should not be understood as limiting the present disclosure.

What is claimed is:

1. A direction of arrival estimation method based on steering vector matrix reconstruction, the method comprising:

obtaining an array sampling covariance matrix according to an array received signal; wherein the array received signal is obtained by receiving a target incident signal using an array antenna; setting a target variable, and limiting a feasible domain of the target variable by using a Hankel matrix transformation operator and a column extraction operator, and determining a first constraint condition of the target variable; the Hankel matrix transformation operator is configured to transform a vector into a Hankel matrix; the column extraction operator is configured to extract columns of a matrix;

characterizing an estimation error of an array covariance matrix based on the target variable and the array sampling covariance matrix, and using the characterized estimation error as a second constraint condition of the target variable; the array covariance matrix is composed of the array sampling covariance matrix and the estimation error of the array covariance matrix;

establishing an initial optimization model according to a preset norm based on partial sum of singular values and constraint conditions of the target variable; the constraint conditions comprise the first constraint condition and the second constraint condition;

determining a multivariable optimization model according to the initial optimization model;

solving the multivariable optimization model based on an alternating direction method of multipliers to obtain an optimal result; the optimal result comprises an optimal target variable;

analyzing the optimal result to obtain a direction of arrival of the target incident signal, wherein the characterizing an estimation error of an array covariance matrix based on the target variable and the array sampling covariance matrix, and using the characterized estimation error as a second constraint condition of the target variable comprises:

characterizing the array covariance matrix according to the target variable;

characterizing the estimation error of the array covariance matrix according to the characterized array covariance matrix and the array sampling covariance matrix; and calculating norms of the estimation error to obtain the second constraint condition of the target variable, wherein the establishing an initial optimization model according to a preset norm based on partial sum of singular values and constraint conditions of the target variable comprises:

replacing the first constraint condition by the preset norm based on partial sum of singular values to obtain a first objective function; and determining an expression of the initial optimization model according to the second constraint condition and the first objective function, and wherein the expression of the initial optimization model is:

$$\min_{U,\gamma} \frac{1}{2}\sum_{i=1}^{L}\|\mathcal{R}[Q_i[U]]\|_{p=1} \text{ s.t. } \|UU^H + \gamma I - \hat{R}\|_F^2 \leq \epsilon, \gamma \geq 0,$$

where $$\min_{U,\gamma}(\cdot)$$

represents optimizing a variable to minimize an objective function; U represents a first target variable; γ represents a second target variable; i represents an index; L represents a quantity of the incident signals; $\mathcal{R}$ represents the Hankel matrix transformation operator; $Q_i$ represents the column extraction operator; p represents a series of the norms; s.t. represents the constraint condition; $(\cdot)^H$ represents a conjugate transpose; $\hat{R}$ represents the array sampling covariance matrix; I represents an identity matrix; $\|\cdot\|_F^2$ represents a Frobenius norm; ∈ represents hyperparameters of the optimization model.

2. The direction of arrival estimation method based on steering vector matrix reconstruction according to claim 1, wherein the determining a multivariable optimization model according to the initial optimization model comprises:

defining a plurality of optimization variables, and characterizing the initial optimization model by using each of the optimization variables to obtain the multivariable optimization model.

3. The direction of arrival estimation method based on steering vector matrix reconstruction according to claim 2, wherein an expression of the multivariable optimization model is:

$$\min_{U,V,Z,\gamma,B} \frac{1}{2}\sum_{i=1}^{L}\|B_i\|_{p=1}$$

$$\text{s.t. } \|Z - \hat{R}\|_F^2 \leq \epsilon, UV^H + \gamma I = Z, \mathcal{R}[Q_i[U]] = B_i, \forall i \in \{1, \ldots, L\},$$

$$U = V, \gamma \geq 0$$

where $$\min_{U,V,Z,\gamma,B_i}$$

represents optimizing a variable to minimize an objective function; U represents a first target variable; γ represents a second target variable; represents an index; L represents a quantity of the incident signals; $\mathcal{R}$ represents the Hankel matrix transformation operator; $Q_i$ represents the column extraction operator; p represents a series of the norms; s.t. represents the constraint condition; $(\cdot)^H$ represents a conjugate transpose; $\hat{R}$ represents the array sampling covariance matrix; I represents an identity matrix; $\|\cdot\|_F^2$ represents a Frobenius norm; ∈ represents hyperparameters of the optimization model; Z, V, and $B_i$ are optimization variables.

4. The direction of arrival estimation method based on steering vector matrix reconstruction according to claim 2, wherein the solving the multivariable optimization model based on an alternating direction method of multipliers to obtain an optimal result comprises:

initializing each of the optimization variables and the target variable;

constructing, based on the multivariable optimization model, an augmented Lagrangian function of the multivariable optimization model; and performing, based on the alternating direction method of multipliers, iterative updating on each of the optimization variables and the target variable to determine a saddle point of the augmented Lagrangian function; the saddle point is the optimal result of the multivariable optimization model.

5. The direction of arrival estimation method based on steering vector matrix reconstruction according to claim 4, wherein an expression of the augmented Lagrangian function is:

$$\mathcal{L}_\mu(U, V, Z, \gamma, \beta, \mathcal{D}, C, M) = \frac{1}{2}\sum_{i=1}^{L}\|B_i\|_{p=1}$$

$$+ \langle C, UV^H + \gamma I - Z\rangle + \frac{\mu}{2}\|UV^H + \gamma I - Z\|_F^2$$

$$+ \sum_{i=1}^{L}\left(\langle D_i, \mathcal{R}Q_iU - B_i\rangle + \frac{\mu}{2}\|\mathcal{R}Q_iU - B_i\|_F^2\right)$$

$$+ \langle M, U - V\rangle + \frac{\mu}{2}\|U - V\|_F^2$$

$$\text{s.t. } \|Z - \hat{R}\|_F^2 \leq \epsilon, \gamma \geq 0$$

where $\mathcal{L}_\mu$ represents a Lagrangian function; C, M, and $D_i$ are Lagrangian multipliers, $\langle X, Y\rangle = \text{tr}(X^HY)$, tr(•) represents a trace of a matrix; μ is a penalty parameter.

6. The direction of arrival estimation method based on steering vector matrix reconstruction according to claim 4, wherein the analyzing the optimal result to obtain a direction of arrival of the target incident signal comprises:

obtaining an optimal first target variable from the optimal result, and determining the direction of arrival of the target incident signal according to the optimal first target variable.

7. A computer device, comprising a memory, a processor, and a computer program stored in the memory and executable on the processor, wherein the processor executes the computer program to implement steps of the direction of arrival estimation method based on steering vector matrix reconstruction as described in claim 1.

* * * * *